US009256438B2

(12) United States Patent
 Chaudhry et al.

(10) Patent No.: US 9,256,438 B2
(45) Date of Patent: Feb. 9, 2016

(54) MECHANISM FOR INCREASING THE EFFECTIVE CAPACITY OF THE WORKING REGISTER FILE

(75) Inventors: Shailender Chaudhry, San Francisco, CA (US); Paul Caprioli, Santa Clara, CA (US); Marc Tremblay, Menlo Park, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1325 days.

(21) Appl. No.: 12/354,206

(22) Filed: Jan. 15, 2009

(65) Prior Publication Data
 US 2010/0180103 A1   Jul. 15, 2010

(51) Int. Cl.
 *G06F 7/38* (2006.01)
 *G06F 9/00* (2006.01)
 *G06F 9/44* (2006.01)
 *G06F 15/00* (2006.01)
 *G06F 9/38* (2006.01)
 *G06F 9/30* (2006.01)

(52) U.S. Cl.
 CPC .......... *G06F 9/3857* (2013.01); *G06F 9/30123* (2013.01); *G06F 9/384* (2013.01); *G06F 9/3842* (2013.01); *G06F 9/3867* (2013.01)

(58) Field of Classification Search
 None
 See application file for complete search history.

(56) References Cited

U.S. PATENT DOCUMENTS

| 6,105,123 | A  | * | 8/2000 | Raje ................................. 712/24 |
| 6,263,416 | B1 | * | 7/2001 | Cherabuddi ..................... 712/23 |
| 2004/0133768 | A1 | * | 7/2004 | Thimmannagari ............ 712/228 |
| 2005/0138297 | A1 | * | 6/2005 | Sodani et al. ................. 711/143 |
| 2007/0136562 | A1 | * | 6/2007 | Caprioli et al. ............... 712/217 |
| 2007/0226467 | A1 | * | 9/2007 | Chaudhry et al. ............ 712/217 |

* cited by examiner

*Primary Examiner* — Corey S Faherty
(74) *Attorney, Agent, or Firm* — Tucker Ellis LLP

(57) ABSTRACT

A computer processor pipeline has both an architectural register file and a working register file. The lifetime of an entry in the working register file is determined by a predetermined number of instructions passing through a specified stage in the pipeline after the location in the working register file is allocated for an instruction. The size of the working register file is selected based upon performance characteristics. A working register file creditor indicator is coupled to the front end pipeline portion and to the back end pipeline portion. The working register file credit indicator is monitored to prevent a working register file overflow. When the a location in the architectural register file is read early, the location is monitored to determine whether the location is written to prior to issuance of the instruction associated with the early read.

20 Claims, 6 Drawing Sheets

MECHANISM FOR INCREASING THE EFFECTIVE CAPACITY OF THE WORKING REGISTER FILE

BACKGROUND OF THE INVENTION

1. Field of the Invention

The present invention relates generally to register files on microprocessors, and more particularly to working register files on microprocessors.

2. Description of Related Art

Early computer processors (also called microprocessors) included a single central processing unit (CPU) that executed only one instruction at a time. As is well known, a CPU executes a program, having instructions stored in memory, by fetching instructions of the program, decoding the instructions and executing the instructions one after the other. In response to the need for improved performance, several techniques, e.g., pipelining, superpipelining, superscaling, speculative instruction execution and out-of-order instruction execution, have been implemented to extend the capabilities of early processors.

Pipelined architectures break the execution of instructions into a number of stages, where each stage corresponds to one step in the execution of the instruction. Pipelined designs increase the rate at which instructions can be executed by allowing a new instruction to begin execution before a previous instruction is finished executing. Pipelined architectures have been extended to superpipelined or extended pipeline architectures, where each execution pipeline is broken down into even smaller stages. In general, superpipelining increases the number of instructions that can be executed in a pipeline at any given time.

Superscalar processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. In this manner, the number of instructions processed is increased due to parallel execution. Each of the two or more execution pipelines may have a different number of stages. Some of the pipelines may be optimized for specialized functions, such as integer operations or floating point operations, and in some cases execution pipelines are optimized for processing graphic, multimedia, or complex math instructions.

Typically, pipelined processors need to provide access to the registers needed for execution at multiple points in the pipeline. This can be done through separate register files, or through a content addressable memory (CAM) based register file coupled with a random access memory (RAM) based register file, or through a combination of the above and direct connections between pipeline stages, etc.

In at least one architecture, the register file has included a working register file (WRF) and an architectural register file (ARF). In this design, the working register file included working registers of the execution unit, while the architectural register file included architectural registers of the execution unit. Typically, each of the working registers corresponds to one of the architectural registers. The working register file stored operands generated for an associated pipeline, prior to validation of executed instructions.

Various designs have made available operands stored within the working register file for use in executing other instructions in an associated pipeline. The architectural register file has been utilized, in conjunction with an associated working register file, to store generated operands of valid executed instructions. The architectural register file has also provided valid operands for transfer to appropriate registers of an associated working register file, in the event that one or more executed instructions are later determined to be invalid.

In a typical execution unit, each instruction has been pre-decoded to include pre-decode bits, at least some of which have been used to resolve operand dependencies with other instructions in a pipeline. The pre-decode bits provided a basis for the generation of control signals that were used to control the operation of the working register file, the architectural register file and their associated pipeline.

A typical pipeline has a number of successive stages, e.g., an operand selection stage, an operand processing (i.e., execution) stage, a working register file operand write stage, an instruction validity determination stage and an architectural register file operand write stage, among other pipeline stages. In the usual case, each of the pipeline stages occur in one machine cycle and a lifetime of an entry in the working register file has been cycle-based. Furthermore, the working register file has traditionally been read during the operand processing or execution stage. The operand processing stage has included registers, which have latched one or more selected source operands. In a typical case, a destination operand for each instruction in the pipeline is generated by arithmetic logic in the operand processing stage for the instruction. This has been accomplished by processing one or more selected source operands in response to control signals generated by control logic of the pipeline.

The control logic has decoded each instruction in the pipeline to generate control signals for controlling the arithmetic logic. The destination operand for each instruction in the pipeline has then been written to the working register file, during the working register file write stage for the instruction. In doing so, the destination operand is stored in one of the working register file working registers, which has corresponded to the architectural register that is specified by the instruction as the destination.

As a result, the destination operands have been available directly from the working register file, which selectively provides source operands from selected working registers in the working register file to the pipeline during an operand selection stage for each instruction in the pipeline. This occurs if it is determined, during the operand selection stage, that the instruction specifies an architectural register in the architectural register file for which the source operand is available in the corresponding working register of the working register file.

For each instruction in a pipeline, it may be determined that the instruction requires an immediate source operand from the control logic, instead of a source operand from the working register file. In this case, a multiplexer selects the immediate source operand. It may also be determined, for each instruction in the pipeline, that the source operand is not yet available in a working register of the working register file, but is in-flight and available elsewhere (or may not be readily available, causing a stall for instance). In this case, the source operand may be available as a destination operand from a previous instruction. In general, the number of operand bypasses required by a pipeline is drastically reduced when a working register file is implemented in conjunction with an execution unit.

Generally, the validity determination stage for each instruction in the pipeline determined whether the instruction was valid or invalid, as indicated by various status signals. In the architectural register file operand write stage, for each instruction in the pipeline that was determined to be valid, the architectural register in the architectural register file that was specified by the instruction as the destination had stored the destination operand provided by the register.

In this way, the architectural register file has been used to store only the destination operands of instructions in the pipeline that are valid. When the validity determination stage determined that an instruction in a pipeline was invalid, the valid operands stored by the architectural registers of the architectural register file (that correspond to the working registers of the working register file) were transferred to the working register file.

The working registers of the working register file then stored the transferred operands to replace the operands currently stored therein. This operation has placed the working register file in the same state that it was at the time just before the invalid instruction was beginning to be executed. As a result, the transferred operands may be subsequently selected as the source operands in the pipeline.

In general, execution units that use working register files and architectural register files provide a reduced number of operand bypasses. Unfortunately, as pipelines have become increasingly complex, it has become increasingly difficult to read the architectural register file in one clock cycle. Multi-issue pipelines exacerbate this problem by requiring larger and slower multi-ported register files.

SUMMARY OF THE INVENTION

In one embodiment, a processor includes a least one pipeline. The pipeline includes an execution pipe; a front end pipeline portion, coupled to the execution pipe, to provide instructions to the execution pipe; and a back end pipeline portion, coupled to the execution pipe, to retire instructions from the execution pipe.

The pipeline has both an architectural register file and a working register file. The working register file stores intermediate results generated by an instruction that has completed execution but may or may not have been retired. The lifetime of an entry in the working register file is determined by a predetermined number of instructions passing through a specified stage in the pipeline after the location in the working register file is allocated for the instruction. Thus, after the instruction is retired, the entry can remain in the working register file until the space is needed for another instruction.

In one embodiment, the working register file is coupled to the execution pipe in the pipeline. The size of the working register file is selected based upon performance characteristics. For example, the working register file is sized so that (i) a first percentage of instructions are executed, by the execution pipe, without stalling the front end pipeline portion; and (ii) the front end pipeline portion is stalled prior to execution of an instruction for a second percentage number of instructions until space becomes available in the working register file. The first percentage and the second percentage sum to one hundred percent.

In one implementation, a working register file is dedicated to an execution unit in the execution pipe and is used only by that execution unit. In another embodiment, a working register file is shared among a plurality of execution units in an execution pipe and this working register file is called a global working register file.

In view of the limited size of the working register file, in one implementation, a working register file creditor indicator is coupled to the front end pipeline portion and to the back end pipeline portion. A value of the working register file credit indicator is changed to indicate less storage is available in the working register file when an entry in the working register file is allocated to an instruction. The value of the working register file credit indicator is changed to indicate more storage is available in the working register file when an instruction is retired. Since multiple instructions can be issued and retired together, the value of the working register file credit indicator can be changed by a value greater than one.

Thus, a computer-processor based method includes changing a value of a working register file credit indicator in a first direction when a location in a working register file is allocated to an instruction. The location is associated with the instruction. This method also changes a value of the working register file credit indicator in a second direction when the instruction is retired. The second direction is opposite to the first direction.

The method monitors the working register file credit indicator and stalls at least a portion of the pipeline of the computer processor when the working register file credit indicator is equal to a low water mark. The halt of the at least a portion of the pipeline is removed when the working register file credit indicator shows that sufficient space is available in the working register file to prevent a working register file overflow.

Since in one implementation, the architectural register file cannot be read in a single processor cycle, the computer processor based method also reads early an operand for an instruction from a location in the architectural register file. The method then monitors the location to determine whether the location is written to subsequent to the early read and before finally issuing the instruction. The method determines whether the operand is in the working register file upon detecting a write to the location. The instruction is refeteched upon the determining finding the operand is not in the working register file.

BRIEF DESCRIPTION OF THE DRAWINGS

In the drawings, elements with the same reference numeral are the same or equivalent elements. Also, the first digit of a reference numeral is the figure number of the figure in which that element first appears.

Figure 1:
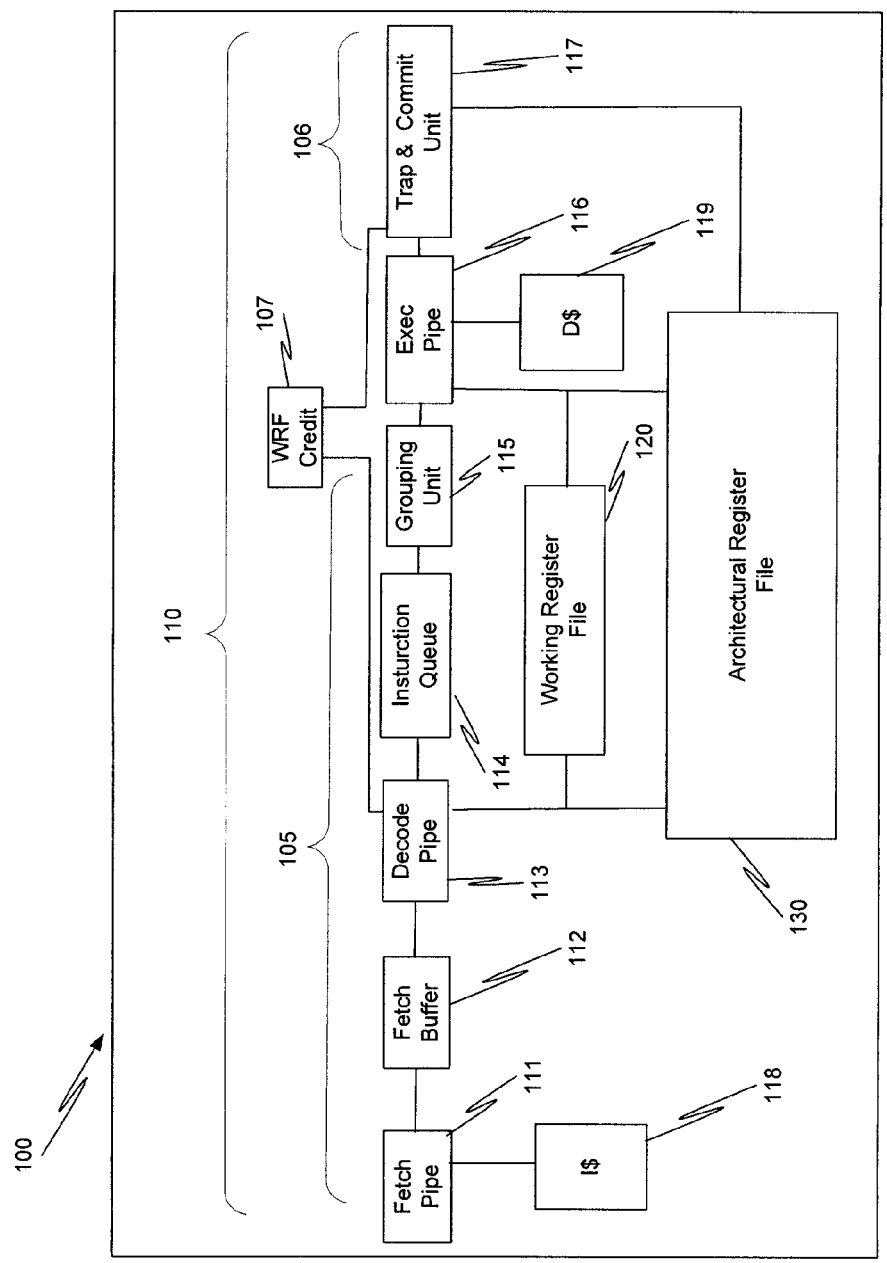
FIG. 1 is a block diagram of a processor that includes a pipeline that utilizes a working register file and a working register file credit indicator according to one embodiment of the invention.

The term "originating instruction" is defined as an instruction which has completed executing, but has not yet retired from pipeline. The term "intermediate result" is defined as a result generated during the execution of an originating instruction, before that originating instruction is retired from pipeline. Intermediate results may be discarded if operating conditions prevent the originating instruction from properly completing retirement, such as a trap condition causing a flush of pipeline.

DETAILED DESCRIPTION

According to one embodiment of this invention, a processor 100 includes at least one pipeline 110 coupled to both a working register file 120 and an architectural register file 130. Working register file 120 stores intermediate results of originating instructions that have completed executing. Architectural register file 130 stores architecturally committed results generated by instructions which have retired from pipeline 110. Architectural register file 130 holds values, which are safe for unconditional use as inputs for subsequent dependent instructions.

Pipeline 110 executes instructions and writes the results to working register file 120. When an instruction is retired, the results for that instruction in working register file 120 are written to architectural register file 130. However, as explained more completely below, upon retirement the results for that instruction in working register file 120 are not necessarily removed from working register file 120.

Working register file 120 is sized smaller than a maximum size needed for storing intermediate results needed for simultaneous execution of multiple instructions using values only from working register file 120. Specifically, the number of storage locations in working register file 120 is less than a number of intermediate results which can exist simultaneously on processor 100. The smaller size of working register file 120 saves process cycle time and allows placement of working register file 120 closer to execution pipeline 116.

The size of working register file 120 is selected based upon performance measurements. For example, the size is selected so that ninety-five percent of the time, the needed data by executing instructions is available in working register file 120. As explained more completely below, prior to execution for the other five percent of the time, pipeline 110 is stalled until space becomes available in working register file 120, as indicated by working register file credit indicator 107.

In view of the limited size of working register file 120, the available space in working register file 120 is monitored, i.e., the utilization of working register file 120 is monitored using working register file credit indicator 107. If utilization of working file register 120 reaches a predetermined level, frontend 105 of pipeline 110 is stalled until space becomes available in working file register 120. This prevents the overwriting of data in working file register 120, i.e., prevents a working register file overflow.

In addition, when an operand is read early from a location in architectural register file 130, the location is monitored. If there is a write to that location in architectural register file 130 before the instruction is finally issued and the operand is not in working file register 120, the instruction is fetched again.

The combination of monitoring the utilization of working register file 120 and the monitoring of locations read early in architectural register file 130 allows smaller register file 120 to be used and proper instruction execution maintained. Since the instances in which either pipeline 110 is stalled or an instruction refetched are limited, smaller working register file 120 results in an overall enhancement in processor performance relative to a similar processor with a full size working register file, which would be much larger and have a larger number of ports.

In contrast to smaller sized working register file 120, the size of architectural register file 130 is larger and further removed from execution pipeline 116. For example, architectural register file 130 can hold simultaneously the architectural state for up to four different threads. In one embodiment, architectural register file 130 is implemented using static random access memory (SRAM).

As explained more completely below, the size of architectural register file 130 means that a read of an operand from architectural register file 130 cannot be completed in a single processor clock cycle. Thus, the reading of that operand from architectural register file 130 is pushed back to an earlier stage in pipeline 110, i.e., read early, so that the operand from architectural register file 130 is available when the instruction is finally issued. As used herein, an early read means that a value is read earlier in the pipeline than normal because the read cannot be completed in a single processor cycle.

Traditionally, entries for storing intermediate results in a working register file have been allocated when an instruction was issued to an execution pipe and survived until the instruction was retired, at which time the intermediate result stored in the working register file entry was committed to the architectural register file. For an architecture having a known depth in the execution pipe, the lifetime of the working register file entry was usually based upon a number of cycles transpiring since the originating instruction was issued (i.e., the number of cycles related to the depth of the execution pipe).

However, for working register file 120, a lifetime of a working register file entry is instruction-based rather than cycle-based. In one example, a working register file entry is allocated for an instruction at the time of decode, in decode pipe 113, of an originating instruction referencing a register. The originating instruction may reside in an instruction queue 114 for an indeterminate number of cycles before being grouped by grouping unit 115 and issued to execution pipe 116.

The lifetime of such a working register file entry continues until a predetermined number of subsequent instructions have been decoded (and, thus, queued for issue). The working register file entry may survive and be available for other instructions even if the originating instruction has already been retired and the intermediate value stored in that entry of the working register file 120 has already been committed to architectural register file 130.

When working register file 120 is implemented as a circular queue, a working register file entry is maintained in the queue irrespective of whether the entry has been retired to the architectural register file. A working register file entry is not overwritten until associated space in the queue is required for a new entry.

Thus, a lifetime of the working register file entry is based upon a predetermined number of instructions proceeding through a specified stage. As noted above, the specified stage may be the last stage of the decode pipe 113. Alternatively, the specified stage may reside elsewhere in the pipeline, depending upon the design of the pipeline.

As illustrated in FIG. 1, pipeline 110 includes a fetch pipe 111, having one or more stages. Fetch pipe 111 is coupled to an instruction store 118, e.g., a level 2 (L2) cache memory. An output of fetch pipe 111 is provided to a fetch buffer 112. In at least one embodiment, fetch buffer 112 is configured to service multiple threads.

Decode pipe 113 includes one or more stages that function to decode instructions. Decode pipe 113 is coupled to an instruction queue 114, which serves to decouple decode pipe 113 from later stages of pipeline 110.

In this example, working register file (WRF) 120 and architectural register file (ARF) 130 are coupled to decode pipe 113, an execution pipe 116, and a trap and commit unit 117.

Instructions stored in instruction queue 114 are grouped, by grouping unit 115, for execution by execution pipe 116. Execution pipe 116 is coupled to trap and commit unit 117, which commits executed instructions to architectural state in architectural register file 130. A data cache 119 is coupled to execution pipe 116. Data cache 110 provides data to execution pipe 116.

During operation, fetch pipe 111 retrieves instructions to be executed from instruction cache 118 and feeds these instructions to decode pipe 113. Decode pipe 113 decodes the instructions and forwards the decoded instructions to instruction queue 114, which is organized as a first-in-first-out (FIFO) queue.

In one embodiment, decode pipe 113 uses working register file credit indicator 107, which is a value stored in a register for example, to determine whether space is available in working register file 120 to allocate to the instruction being decoded. If space is available, decoding continues normally. If space is not available in working register file 120, front-end 105 of pipeline 110 is stalled until sufficient space becomes available in working register file 120.

Instruction queue 114 supplies a group of decoded instructions to grouping unit 115, which sorts the instructions and forwards each instruction to a corresponding execution unit that can execute that instruction.

In addition to sorting the instructions, grouping unit 115 checks each instruction for unresolved data dependencies. Unresolved data dependencies occur when an instruction requires read or write access to a register that is not yet available. With each processor cycle, grouping unit 115 continues to issue batches of instructions to execution pipe 116.

Working register file 120 can be implemented in a variety of ways with respect to execution units in execution pipe 116. For example, in FIGS. 2A to 2D, three execution units are shown, an adder 210 that functions in a single processor cycle; a floating point adder 220 that functions in four processor cycles; and a floating point multiplier 230 that functions in eight processor cycles. Each execution unit has a dedicated working register file 215, 225, and 235 respectively.

An intermediate result AA (FIG. 2A) from an originating add instruction is generated in a single processor cycle by adder 210. Intermediate result AA is also provided as an input to floating point adder 220 and to floating point multiplier 230.

Figure 2A:
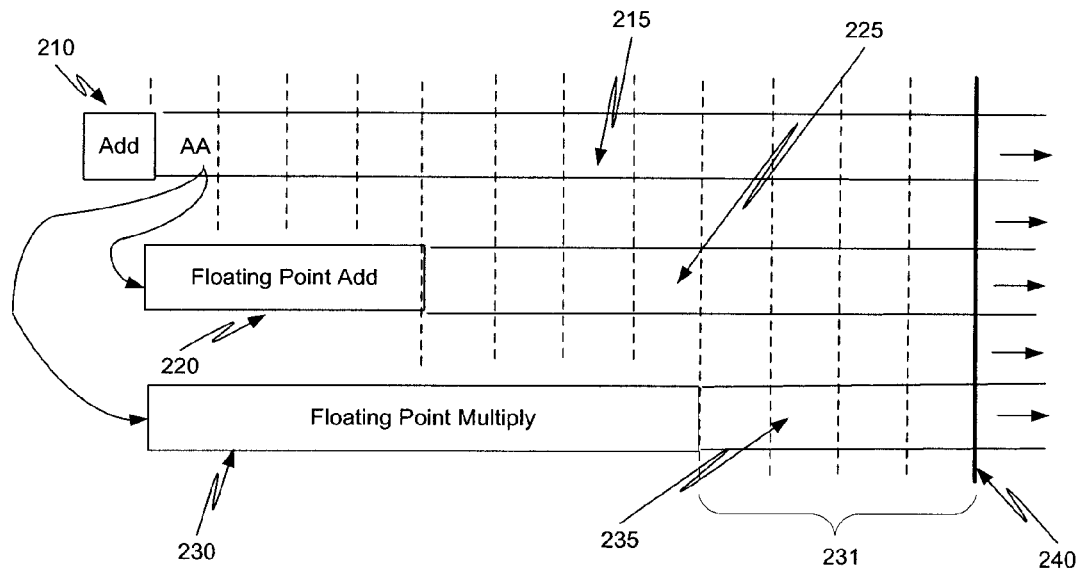
FIGS. 2A to 2D illustrate use of dedicated working register files by a plurality of execution units according to one embodiment of the invention.
Figure 2B:
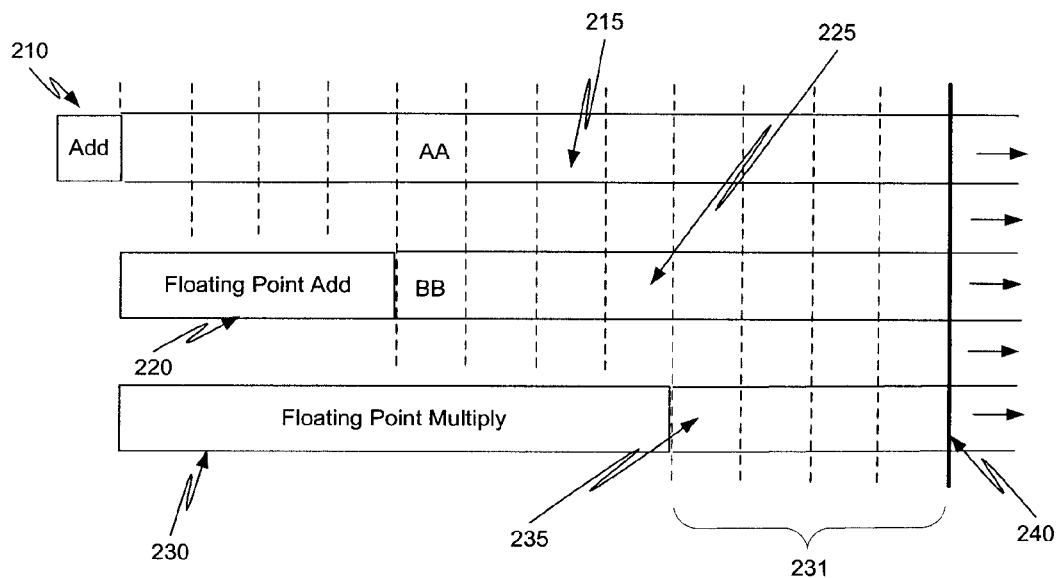

As floating point adder 220 and floating point multiplier 230 process intermediate result AA, intermediate result AA moves along working file register 215. Floating point adder 220 generates a second intermediate result BB in working file register 225 (FIG. 2B).

Figure 2C:
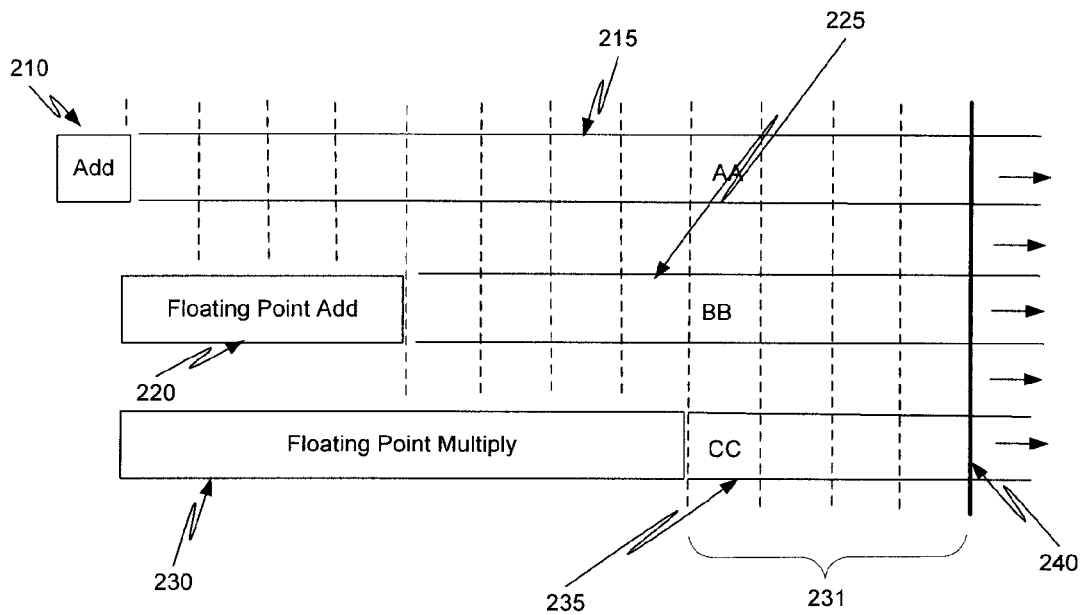
Figure 2D:
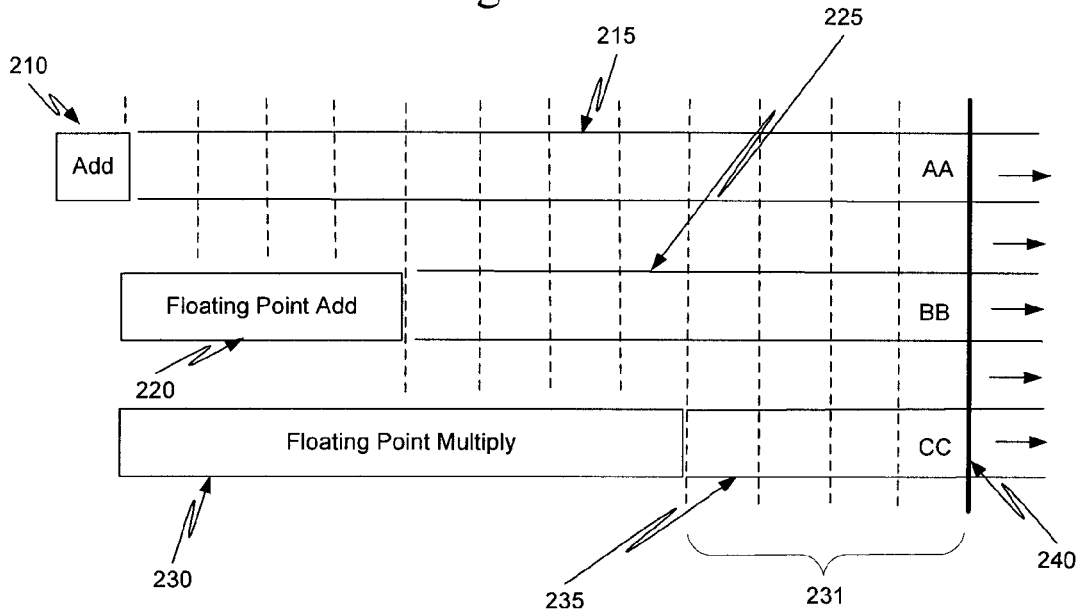

Intermediate result AA continues to move along working file register 215 and intermediate result BB moves along working file register 225. After a number of cycles, floating point multiply generates a third intermediate result CC (FIG. 2C).

Intermediate result AA continues to move along working file register 215; intermediate result BB continues to move along working file register 225; and intermediate result CC moves along working register file 235. After a retirement latency 231, if appropriate, intermediate results AA, BB, and CC are written to architectural register file 130 at retirement time 240, i.e., are committed, assuming that no structural hazards exist.

Each of intermediate results AA, BB, CC is maintained in working register file 215, 225, and 235, respectively until a predetermined number of instructions pass through a particular stage of pipeline 110 (FIG. 1), as described above. Thus, even though each of the intermediate results has been written to architectural register file 130, the intermediate result is maintained in the working register file until the predetermined number of instructions has passed through the particular stage of pipeline 110. This is represented in FIG. 2 by the arrows on the left of the drawing.

In FIGS. 2A to 2D, a working register file is associated with an execution unit. In another embodiment, a working register file 320 is shared by a plurality of execution units 301 to 304 in a core 310-1 on a single chip processor 300.

Figure 3:
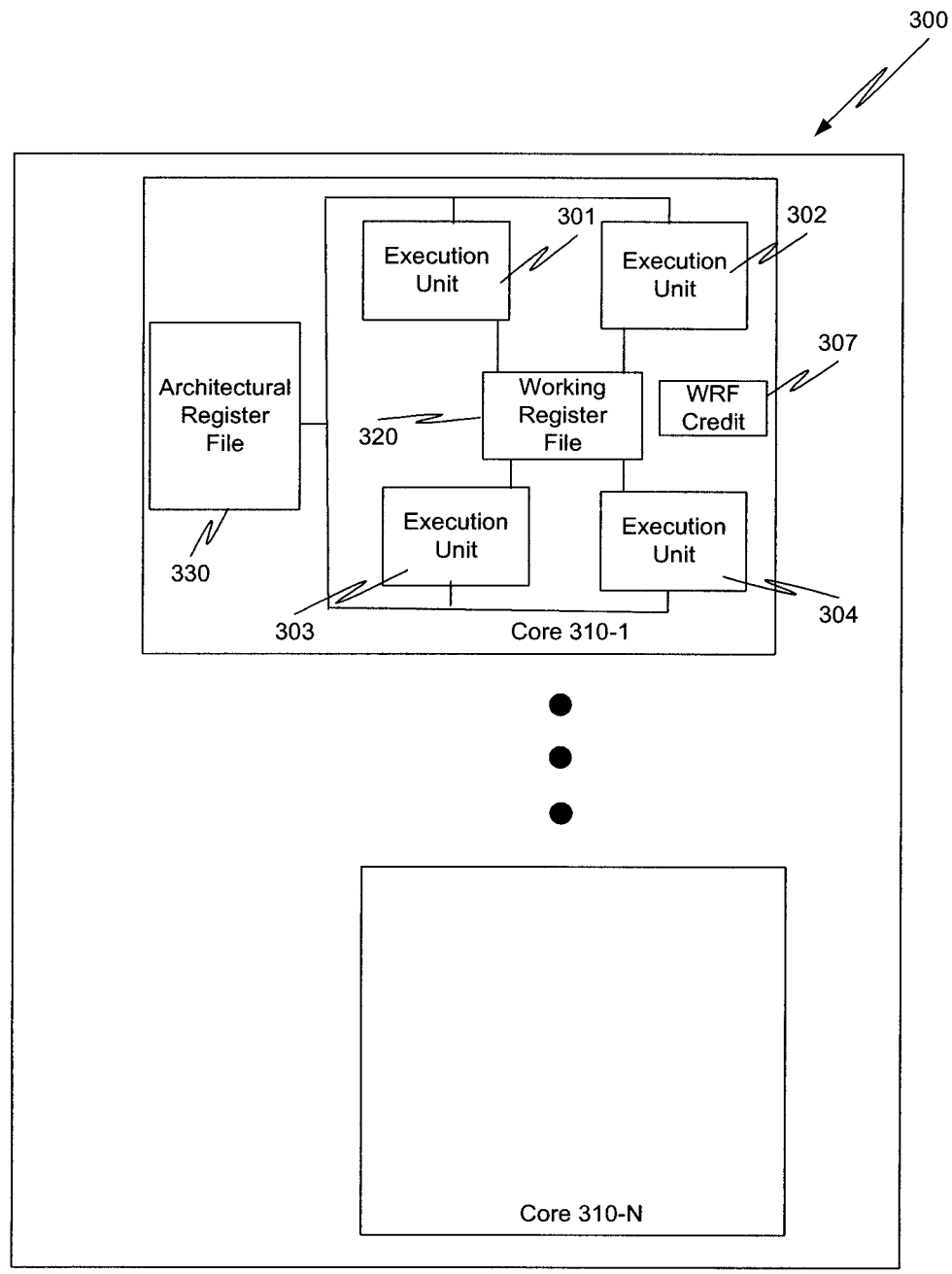
FIG. 3 is a block diagram of a processor that includes a plurality of cores where at least one core includes a plurality of execution units that shared a global working register file according to one embodiment of the invention.

In the example of FIG. 3, processor 300 has N cores where N is an integer. For example, in one embodiment, the plurality of processor cores includes sixteen processor cores with each processor core having multiple execution units, e.g., four execution units per core as shown in FIG. 3.

Working register file 320 is a global working register file as opposed to the dedicated working register files 215, 225, 235 in FIGS. 2A to 2D. In one embodiment, working register file 320 is implemented as a circular queue that does not require a separate pointer to a tail of the queue.

In view of the limited size of working register file 320, a number of in-flight instructions is limited to a predetermined maximum number, which is a function of the size of working register file 320. Decoding of a new instruction in decode pipe 113 is stalled, whenever a maximum number of instructions are already in-flight, and decoding is resumed when an in-flight instruction is retired, i.e., is no longer in-flight. For example, in-flight instructions may be limited to thirty-two instructions. As used herein the term "in-flight" refers to an instruction that has already been queued for issue to execution pipe 116 in pipeline 110.

To prevent working register file overflow, core 310-1 maintains a working register file credit indicator 307. Since multiple instructions can be issued together and retired simultaneously, working register file credit indicator 307 can be incremented and decremented by more than one. In one embodiment, working register file credit indicator 307 is initialized to a value corresponding to the number of available locations in working register file 320.

As the locations in working register file 320 are allocated to instructions, the working register file credit indicator 307 is decremented. As instructions are retired, the locations in working register file 320 associated with those instructions are released, i.e., the working register file credit indicator 307 is incremented. Those of skill will appreciate that the direction of the change in working register file credit indicator 307 is dependent on the initialization of working register file credit indicator 307 and so the above example is illustrative only.

If the value of the working register file credit indicator 307 reaches a predetermined low water mark, e.g., one of zero or one, core 310-1 halts issuance of further instructions, but permits the pipeline to keep retiring originating instructions. As locations in working register file 320 are released and working register file credit indicator 307 is incremented to a value greater than the predetermined low water mark, the halt condition is dropped and core 310-1 resumes issuing instructions.

Figure 4:
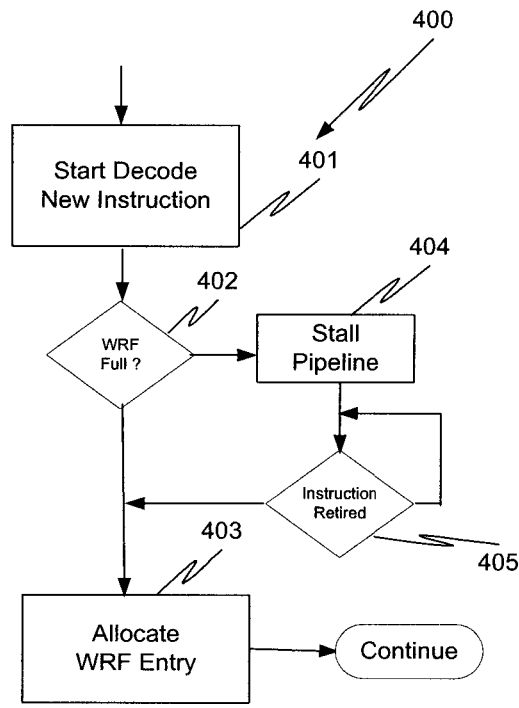
FIG. 4 is a process flow diagram for a method for monitoring available space in a working register file and controlling at least a portion of a pipeline based on the available space according to one embodiment of the invention.

FIG. 4 is one example of a method 400 used to prevent overflow of working register file 320. In this example, process 401 starts the decode of a new instruction, i.e., an instruction from fetch buffer 112, and transfers to working register file full check operation 402.

If the working register file credit indicator 307 is greater than the low water mark, check operation 402 transfers to allocate working register file entry process 403, and otherwise to stall pipeline process 404. Allocate working register file entry process 403 allocates a location in working register file 320 for the intermediate result that will be generated by execution of the originating instruction and decrements working register file credit indicator 307. Processing then continues normally.

Conversely, as indicated above, if check operation 402 determines that working register file 320 is full, stall pipeline operation 404 stalls front end 105 of pipeline 110 so no further instructions are decoded until the stall condition is removed. However, the backend of pipeline 110 continues to execute.

After the pipeline is stalled, instruction retired check 405 determines whether the backend of pipeline 110 retired one or more instructions and incremented working register file indicator 307. In this example, instruction retired check operation 405 determines whether working register file credit indicator 307 is greater than the low water mark. If the working register file credit indicator 307 is greater than the low water mark, check operation 405 removes the stall condition and transfers to allocate working register file entry operation 403 and otherwise processing remains in instruction retired check operation 405.

Instruction retired check operation 405 should not be interpreted as requiring continuous polling of working register file credit indicator 307, but rather simply that the front end of the pipeline remains stalled until check operation 405 receives an indication that sufficient space is available in working register file 320.

According to another aspect of the present invention, the architectural register file is read early, i.e., prior to issuance of an associated instruction. As used herein the term "reading a register file entry" includes initiating a read, although actual contents of the register file entry may not be known: (1) for one or more cycles, or (2) until after a content addressable memory (CAM) cycle completes to identify the register holding the desired contents.

Figure 5:
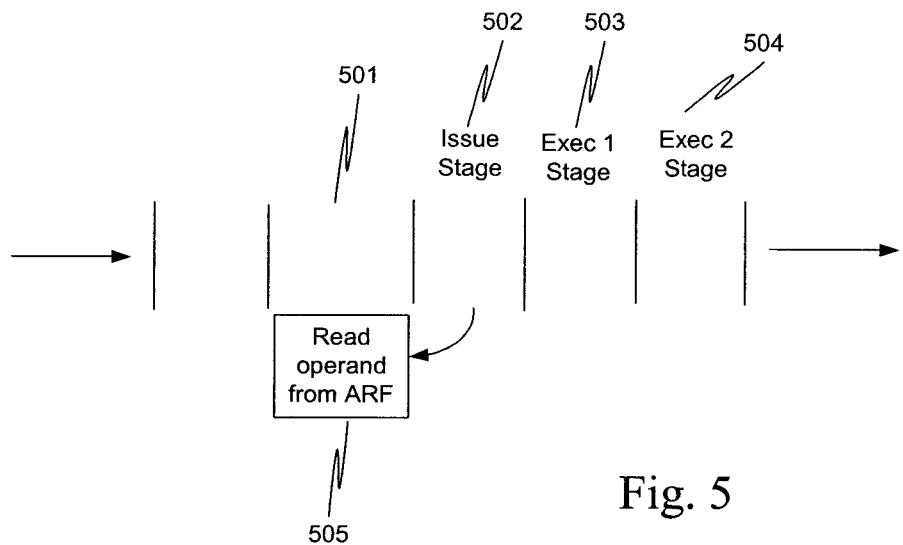
FIG. 5 illustrates the meaning of an early read of a location in an architectural register file according to one embodiment of the invention.

For example, as indicated in FIG. 5, one or more execution stages 503, 504 follow issue stage 502. However, since architectural register file 130, 330 cannot be read in a single processor cycle, the read of operand for an instruction that issues in issue stage 502 is pushed to a location 501 in the pipeline preceding issue stage 505. Thus, read operand from architectural register file 505 is performed early. In FIG. 5, only the portion of the pipeline needed to demonstrate the early read is presented.

When a value is read early from a location in architectural register file 130, 330 for an instruction to be issued, a speculative value is used and processing continues. However, if the location that is read early is written to before the instruction associated with the early read is issued, the read value is incorrect.

However, since a value of the operand is maintained in working register file 320 until a predetermined number of instructions have passed through a specified stage in the pipeline, the correct value should be in working register file 320 even though the originating instruction that generated the correct value has been retired. Therefore, it should be possible to read the correct value from working register file 320.

In one example, process 600 is used to assure that a correct operand value is used when an early read of the architectural register file is performed.

In process 600, read value early from location in the architectural register process 601 reads a value for an operand for an instruction to be issued early as described above with respect to FIG. 5. Process 601 transfers to architectural location written to check operation 602.

Figure 6:
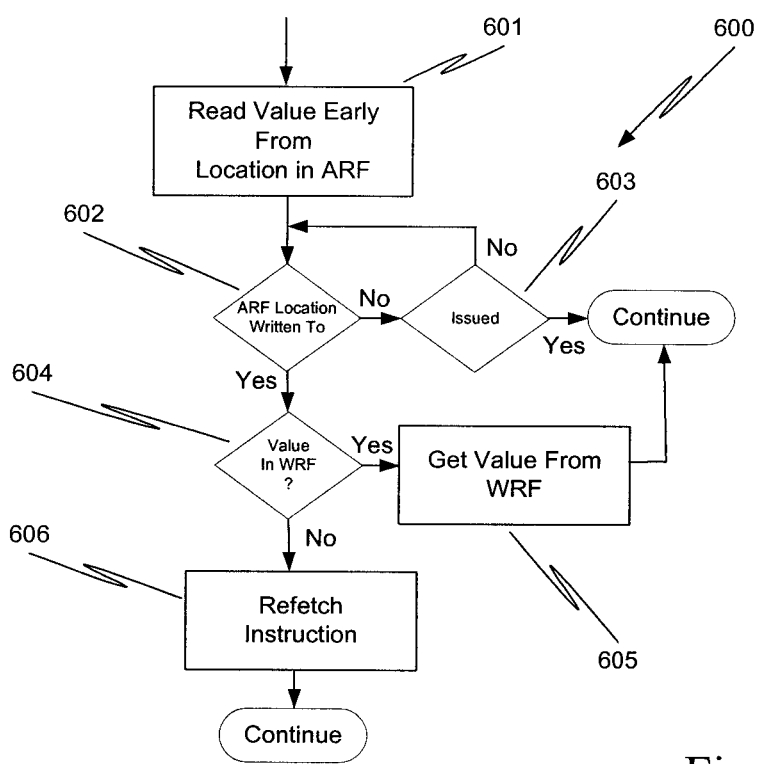
FIG. 6 is a process flow diagram for assuring when there is a read early from of a location in an architectural register file a current value is used for the read operand according to one embodiment of the invention.

Architectural location written to check operation 602 monitors the location in architectural register file 130, 330 that was read early. If the location is not written to before the instruction associated with the early read is issued, processing simply continues, as indicated in FIG. 6, by check operation 602 transferring to issue check operation 603 when a write to the location is not detected.

Issue check operation 603 transfers processing back to check operation 602 if the instruction associated with the early read has not been issued. Again, FIG. 6 should not be interpreted as requiring continuous polling and transferring between check operation 602 and check operation 603, but rather that the location in the architectural register file that was read early is monitored until one of (a) the instruction is issued or (b) the location is written occurs.

If check operation 602 determines that the location in architectural register file 602 has been written, check operation 602 transfers to value in working register file check operation 604. Working register file check operation 604 determines whether the operand for the instruction awaiting issue in working register file 320.

If the operand is in working register file 320, check process 604 transfers to get operand value from working register file operation 605, which reads the value from the working register file. Processing then continues normally. Conversely, if the operand is not in working register file 320, check operation 604 transfers to refetch instruction operation 606 that in turn causes the instruction for which the early read was performed to be refetched.

For convenience method 400 and method 600 have been described separately. However, those of skill in the art appreciate that both methods can be operating at the same time. Also, the methods can be implemented using hardware, firmware, software or any combination of these.

Figure 7:
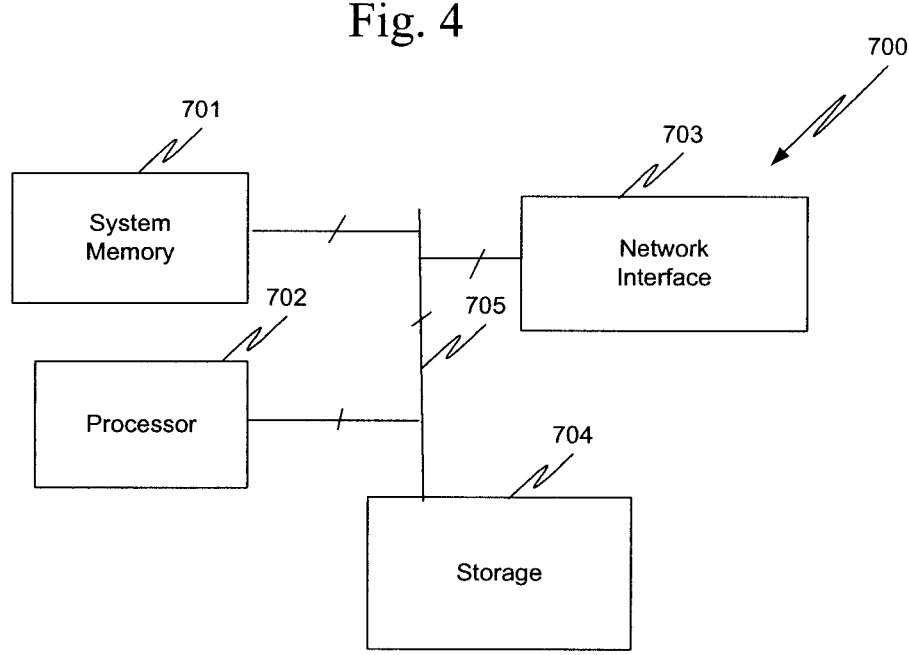
FIG. 7 is a block diagram of a system that includes embodiments of this invention.

FIG. 7 depicts an example of a computer system 700 constructed according to various aspects of the present invention. Computer system 700 includes a processor 702, which may include multiple cores, a single threaded processor, a multithreaded processor, etc., which implements one or more of pipelines 110 with at least one of the working register files described herein. In one embodiment computer system 700 is a stand alone system, while in another embodiment computer system 700 is networked and is part of a client-server system.

Computer system 700 also includes system memory 701, e.g., one or more cache levels, SRAM, DRAM, RDRAM, EDO RAM, DDR RAM, and/or EEPROM, etc., a system bus 705 (e.g., LDT, PCI, ISA, etc.), a network interface 703 (e.g., an ATM interface, an Ethernet interface, a Frame Relay interface, etc.), and storage 704, e.g., optical storage, magnetic storage, etc.

Computer system realizations of the invention may include fewer or additional components not illustrated in FIG. 7. For example, computer system 700 may also include a video card, an audio card, additional network interfaces, peripheral devices, etc. Processor 702, storage 704, network interface 703 and system memory 701 are coupled to system bus 705, which includes a plurality of address, data and control lines. Processor 702 includes instruction store 118 and a memory interface that couples the instruction store 118 to a memory hierarchy, i.e., system memory 701. It should be appreciated that the computing apparatus described herein may be embodied as a design file representation including machine readable instructions encoded on one or more computer readable media.

We claim:

1. A processor comprising:
a pipeline including front end pipeline portion, an execution pipe, and a back end pipeline portion;
an architectural register file (ARF) having a size such that reading a location in the ARF requires more than a single processor cycle;
a working register file (WRF) wherein a lifetime of an entry in said WRF may continue after an originating instruction that generated said entry is retired;
wherein the front end pipeline portion comprises an issue stage configured to issue instructions to said execution pipe, and a pre-issue stage configured to read early an ARF location to obtain a first value of an operand for a particular instruction that issues in the issue stage so that said operand is available upon issue of the particular instruction by the issue stage;
wherein said processor is configured to monitor said ARF location after said read early to determine whether said ARF location is written to after said read early and before said particular instruction is issued by said issue stage;
wherein, if said ARF location is not written to after said read early and before said particular instruction is issued by said issue stage, the issue stage is configured to issue said particular instruction for operation on said first value of said operand;
wherein, if said ARF location is written to after said read early and before said particular instruction is issued by said issue stage, the processor is configured to,
determine whether a second value of the operand for the particular instruction is stored in the WRF, and
transfer the second value of the operand from the WRF to the issue pipeline to replace the first value of the operand if the operand value for said particular instruction is stored in the WRF, and
refetch said particular instruction if the operand value for said particular instruction is not stored in the WRF.

2. The processor of claim 1, wherein said processor is configured to monitor said ARF location after said read early and until the occurrence of either of, issuance of said particular instruction, and writing to said ARF location.

3. The processor of claim 1, further comprising:
a WRF creditor indicator having a value;
wherein the value of said WRF credit indicator is changed to indicate less storage is available in said WRF when an entry in said WRF is allocated to an instruction in said pipeline; and
wherein the value of the WRF credit indicator is changed to indicate more storage is available in said WRF when an instruction is retired from said pipeline.

4. The processor of claim 1, further comprising:
a WRF creditor indicator having a value;
wherein the value of said WRF credit indicator is changed to indicate less storage is available in said WRF when an entry in said WRF is allocated to an instruction in said pipeline upon decoding of an originating instruction referencing a register; and
wherein the value of the WRF credit indicator is changed to indicate more storage is available in said WRF when an instruction is retired from said pipeline.

5. The processor of claim 4, wherein the processor is configured to stall said front end pipeline portion of said pipeline if the value of the WRF credit indicator indicates said WRF is full.

6. The processor of claim 1, wherein said WRF is a global WRF coupled to said pipeline and at least one additional pipeline.

7. The processor of claim 1, wherein said WRF is a dedicated WRF coupled to said pipeline and no other pipeline.

8. The processor of claim 1, wherein the lifetime of an entry in said WRF continues until a predetermined number of instructions have passed through a specified stage in the pipeline.

9. The processor of claim 1, wherein the lifetime of an entry in said WRF continues until a predetermined number of instructions have passed through the end of said issue stage of said front end pipeline portion of said pipeline.

10. The processor of claim 1, wherein the WRF is limited in size and wherein the processor is configured to use a file credit indicator to stall said front end pipeline in order to prevent WRF overflow.

11. A method implemented of a processor comprising a pipeline including an execution pipe and a front end pipeline portion having an issue stage configured to issue instructions to said execution pipe, an architectural register file (ARF) having a size such that reading a location in the ARF requires more than a single processor cycle, and a working register file (WRF) wherein a lifetime of an entry in said WRF may continue after an originating instruction that generated said entry is retired, the method comprising:
providing a pre-issue stage preceding said issue stage in said pipeline;
using said pre-issue stage to read early an ARF location to obtain a first value of an operand for a particular instruction that issues in the issue stage so that said operand is available upon issue of the particular instruction by the issue stage;
monitoring said ARF location to determine whether said ARF location is written to after said read early and before said particular instruction is issued by said issue stage;
issuing said particular instruction for operation on said first value of said operand from said issue stage to said execution pipe if said ARF location is not written to after said read early and before said particular instruction is issued by said issue stage;
determining whether a second value of the operand for the particular instruction is stored in the WRF if said ARF location is written to after said read early and before said particular instruction is issued by said issue stage, and
transferring the second value of the operand from the WRF to the issue pipeline to replace the first value of the operand if the operand value for said particular instruction is stored in the WRF, and
refetching said particular instruction if the operand value for said particular instruction is not stored in the WRF.

12. The method of claim 11, wherein said monitoring is continued after said read early and until the occurrence of either of, issuance of said particular instruction, and writing to said ARF location.

13. The method of claim 11, further comprising:
providing a WRF creditor indicator having a value;
changing the value of said WRF credit indicator to indicate less storage is available in said WRF when an entry in said WRF is allocated to an instruction in said pipeline; and
changing the value of said WRF credit indicator to indicate more storage is available in said WRF when an instruction is retired from said pipeline.

14. The method of claim 13, further comprising:
stalling said front end pipeline portion of said pipeline if the value of the WRF credit indicator indicates said WRF is full.

15. The method of claim 11, further comprising:
providing a WRF creditor indicator having a value;
changing the value of said WRF credit indicator to indicate less storage is available in said WRF when an entry in said WRF is allocated to an instruction in said pipeline upon decoding of an originating instruction referencing a register; and
changing the value of said WRF credit indicator to indicate more storage is available in said WRF when an instruction is retired from said pipeline.

16. The method of claim 11, maintaining the lifetime of an entry in said WRF until a predetermined number of instructions have passed through a specified stage in the pipeline.

17. The method of claim 11, maintaining the lifetime of an entry in said WRF until a predetermined number of instructions have passed through the end of said issue stage of said front end pipeline portion of said pipeline.

18. The method of claim 11, wherein the WRF is limited in size and wherein the method further comprises:
using a file credit indicator to stall said front end pipeline in order to prevent WRF overflow.

19. The method of claim 11, wherein monitoring said ARF location to determine whether said ARF location is written to after said read early and before said particular instruction is issued by said issue stage is performed to assure that a correct value is selected for the operand for the particular instruction.

20. A processor comprising:
a pipeline including front end pipeline portion and an execution pipe;
an architectural register file (ARF) having a size such that reading a location in the ARF requires more than a single processor cycle;
a working register file (WRF) wherein a lifetime of an entry in said WRF may continue after an originating instruction that generated said entry is retired;
wherein the front end pipeline portion comprises an issue stage configured to issue instructions to said execution pipe, and a pre-issue stage configured to read early an ARF location to obtain a first value of an operand for a particular instruction that issues in the issue stage so that said operand is available upon issue of the particular instruction by the issue stage;
wherein said processor is configured to monitor said ARF location after said read early to determine whether said ARF location is written to after said read early and before said particular instruction is issued by said issue stage to assure that a correct value is selected for the operand for the particular instruction;
wherein, if said ARF location is written to after said read early and before said particular instruction is issued by said issue stage, the processor is configured to,
determine whether a second value of the operand for the particular instruction is stored in the WRF,
transfer the second value of the operand from the WRF to the issue pipeline to replace the first value of the operand if the operand value for said particular instruction is stored in the WRF, and
refetch said particular instruction if the operand value for said particular instruction is not stored in the WRF.

* * * * *